Nov. 26, 1935.  C. M. SNYDER  2,022,220
DISHWASHING MACHINE
Original Filed Dec. 19, 1930   2 Sheets-Sheet 1
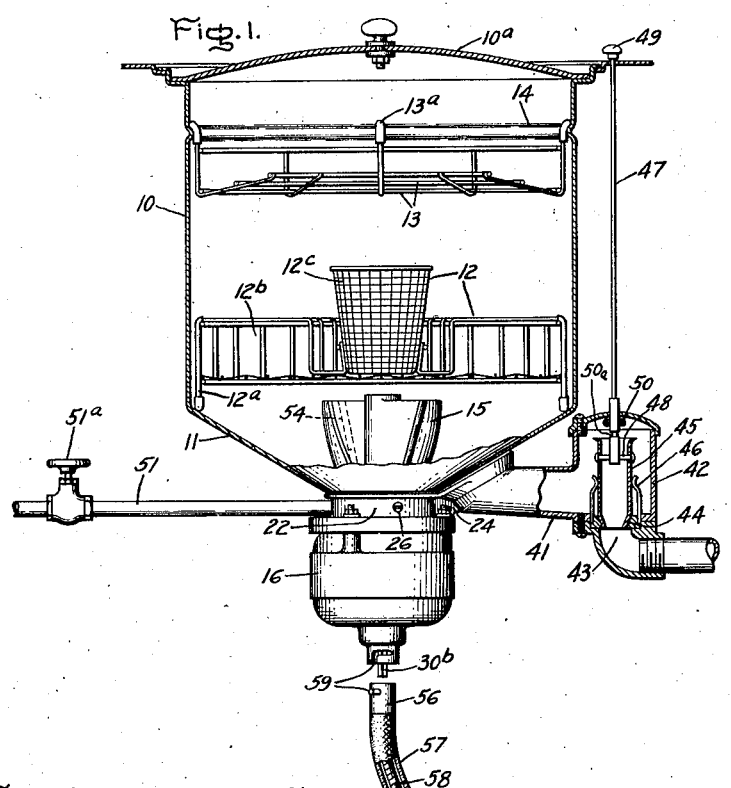
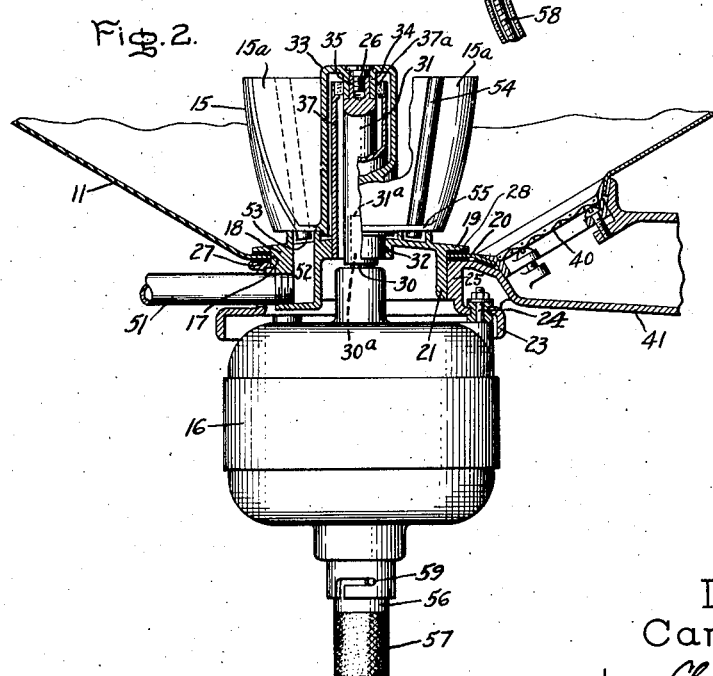
Inventor:
Carl M. Snyder,
by Charles N. Tallan
His Attorney.

Nov. 26, 1935.  C. M. SNYDER  2,022,220

DISHWASHING MACHINE

Original Filed Dec. 19, 1930  2 Sheets-Sheet 2

Inventor:
Carl M. Snyder,
by Charles V. Tulla
His Attorney.

Patented Nov. 26, 1935

2,022,220

UNITED STATES PATENT OFFICE 2,022,220

DISHWASHING MACHINE

Carl M. Snyder, Glen Ellyn, Ill., assignor to Walker Dishwasher Corporation, a corporation of Delaware Application December 19, 1930, Serial No. 503,534
Renewed April 3, 1935

13 Claims. (Cl. 141—9)

My invention relates to improvements in machines for washing dishes and the like and has for its object the provision of means whereby the utility of the machine is increased and its functions extended.

One object of my invention is to provide means whereby clean, fresh water may be admitted under pressure to the washing chamber or vat under conditions such that the dishes will be thoroughly rinsed.

Another object of my invention is to provide means in connection with a dish washing machine whereby pans and other utensils to which food and other foreign matter so firmly adheres as not to be removable by the ordinary washing process may be thoroughly cleaned.

Still another object of my invention is to provide means whereby an electric motor for driving the washing machine may be conveniently utilized for other applications than that of the driving of the impeller of the machine.

Other objects of my invention will appear in my specification, and will be more particularly pointed out in the appended claims.

Figure 3:
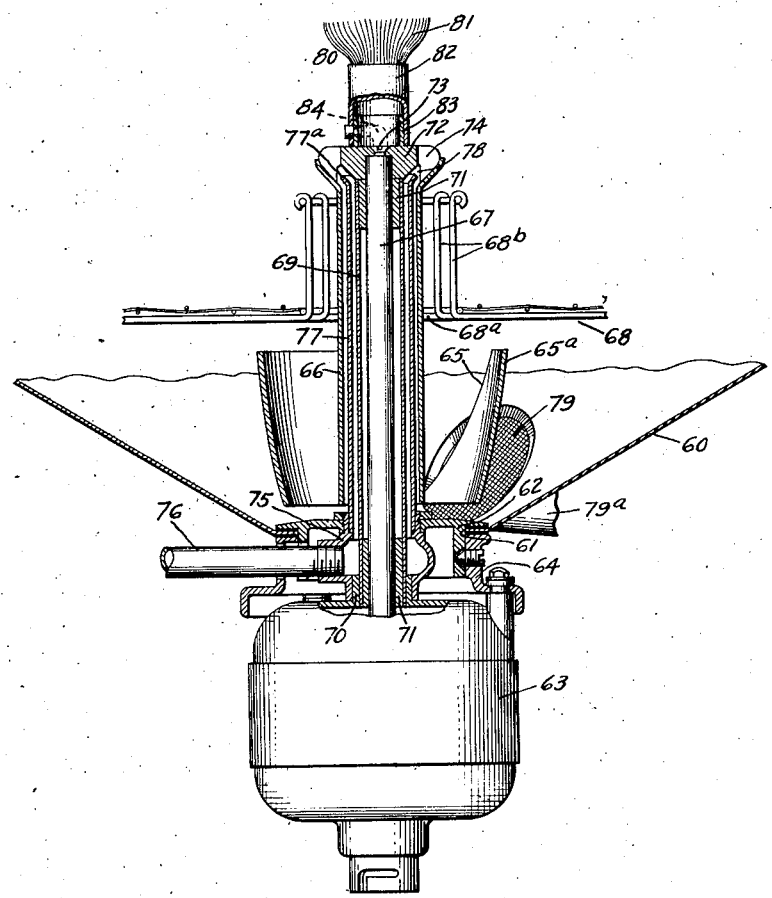
Figure 4:
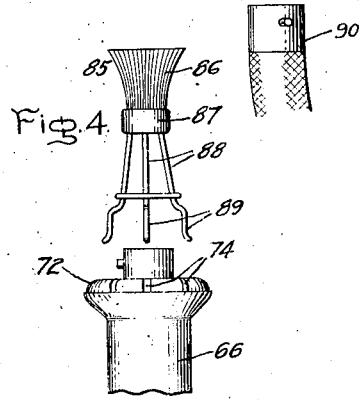

For a more complete understanding of my invention reference should be had to the accompanying drawings in which Fig. 1 is a vertical elevation of a dish washing machine embodying my invention, portions being shown in section so as to illustrate certain structural details; Fig. 2 is a fragmentary view illustrating a portion of the dish washing machine of Fig. 1 having portions shown in section and other portions broken away so as to illustrate certain structural details; Fig. 3 is a fragmentary view in elevation of a dish washing machine embodying a modified form of my invention, portions of the machine being shown in section and other portions being broken away so as to illustrate certain structural details; and Fig. 4 illustrates a portion of the machine shown in Fig. 3, together with an auxiliary cleansing device.

Referring to Figs. 1 and 2 of the drawings, I have shown my invention in one form in connection with a dish washing machine comprising an upright cylindrical washing chamber or vat 10 for receiving dishes and like utensils to be cleaned and also some suitable washing fluid, such as hot cleansing water. As shown, the vat 10 is provided with an inverted frusto-conical bottom wall 11 preferably formed integrally with the side walls of the vat. While the vat together with its bottom wall may be made of any suitable material, I prefer to form them from suitable sheet metal such as a rust resisting steel, which preferably will be plated or enameled. A suitable removable metallic sheet metal cover 10a is provided for the vat 10.

A suitable utensil supporting open-work tray or basket 12 is provided in the lower portion of the vat 10, and is removably supported therein upon the marginal edge portions of the bottom wall 11 by means of suitable legs 12a; and a suitable open-work utensil supporting tray 13 is arranged in the upper portion of the vat, this latter basket having at its upper edge suitable supporting arms 13a arranged when the basket is in position in the vat to engage and rest upon a suitable ledge 14 formed in the vat. This ledge may be and as shown is formed as an inwardly projecting bead shaped from the material forming the side walls of the vat; if desired, this ledge may be formed on a separate member (not shown) overhanging the mouth of the vat. While these trays 12 and 13 may have any suitable well-known construction, the lower tray preferably will be provided with two compartments 12b and 12c arranged substantially concentrically of each other, the outer compartment 12b serving to receive platters, plates, saucers, side dishes, shallow bowls and like utensils, while the inner compartment 12c is utilized for receiving knives, forks, silverware, etc.; the upper basket preferably will be arranged to receive glasses, bowls, cups, etc.

It will be understood that these trays 12 and 13 can easily be lifted and so .an be loaded or unloaded in or out of the vat as is most convenient. It will also be understood that the vat 10 will be provided with a suitable supporting casing or framework (not shown) so as to be held in substantially vertical position and at a convenient height.

In the lower portion of the vat 10 and preferably arranged so as to be substantially embraced by the bottom wall 11 is a suitable impeller 15 which preferably will be driven by a suitable electric motor 16.

It will be understood that the impeller will be provided with blades 15a which may have any suitable shape, the important feature being that the blades be given a shape such that the cleansing fluid in the lower portion of the vat be thrown upwardly and outwardly in an efficient manner through the dish supporting trays 12 and 13 by the rotary motion of the impeller. The impeller together with its blades will be formed from some suitable material such as cast aluminum, or pressed steel.

It will be observed that the bottom wall 11 of the vat is provided with a centrally arranged circular opening 17 (Fig. 2) formed therein. Within this opening is mounted a bushing 18. This bushing is provided with a substantially horizontal annular flange portion 19 which rests upon the inner surface of a suitable substantially flat supporting ledge 20 formed from the material of the bottom wall surrounding the opening 17. This bushing also is provided with a depending cylindrical portion 21 extending downwardly through the opening 17.

The bushing 18 serves to carry a suitable frame 22 for supporting the impeller motor 16, this frame having an outwardly projecting flange or apron portion 23 to which the motor is detachably secured by some suitable means, such for example as bolts 24 secured to the upper portion of the motor frame and passed through suitable apertures provided for them in the apron.

It will be observed that the frame 22 is provided above the apron 23 with a cylindrical portion 25 which surrounds and which fits rather closely the cylindrical depending portion 21 of the bushing 18. This portion 25 of the frame is detachably secured to the bushing by means of suitable clamping set screws 26, only one of which is shown (Fig. 1), disposed circumferentially about the frame.

The upper portion of the motor supporting frame 22 is provided with a substantially flat annular surface 27 which cooperates with the flange portion 19 of the bushing 18 so as to clamp the annular ledge 20 of the bottom wall 11 between them. Interposed and firmly clamped between the upper and lower surfaces of this ledge and the lower surface of the flange 19 and the upper surface 27 of the frame 22 respectively are suitable washers or gaskets 28 arranged so as to form a water tight joint at the opening 17 formed in the bottom wall 11.

The impeller driving motor 16 is mounted upon the frame 22 so that its shaft 30 is substantially coaxial with the axis of the bushing 18 and consequently with the vertical central axis of the vat 10. The motor shaft 30 is mechanically connected with the impeller by means of a suitable driving member 31 which extends upwardly from the motor frame and through a suitable opening 32 provided for it in the bushing 18. It will be observed that a portion 30a of the motor shaft extends upwardly through the opening 32; this upwardly extending portion of the shaft has a square or other suitable non-circular cross-section which is received in and which interfits with a recess 31a provided for it in the lower portion of the member 31. By reason of this arrangement it will be observed that the motor is mechanically connected to impart rotary motion to the driving member 31.

The upper end portion of the member 31 is mechanically connected with the impeller 15. To effect this connection, I provide the impeller with a vertically arranged elongated hollow hub 33 preferably formed integrally with the impeller. This hub is arranged so as to receive the vertically positioned operating member 31. As shown, the upper end of the hub is provided with an inturned flange 34 the inner edges of which are turned downwardly substantially parallel with the vertical axis of the hub. This flange 34 receives a reduced and axially extending portion 35 formed on the upper end of the operating member 31. It will be understood that the flange may be keyed to this reduced portion of the operating member or may be secured thereto in any suitable fashion. A suitable set screw 36 is passed through an aperture provided for it in the upper surface of the hub and is threaded in the reduced portion 35, the set screw cooperating with the hub so as to prevent vertical displacement of the impeller.

The bushing 18 is provided with a tubular post or member 37 extending upwardly therefrom in substantially concentric arrangement with the operating member 31, the cylindrical post having a diameter somewhat larger than the diameter of the operating member so as to provide for ample clearance between these members. The tubular post 37 may be secured to the bushing 18 in any suitable manner but preferably will be brazed or welded thereto. Preferably the upper end of this tubular post will be provided with a felt washer or other suitable like member 37a fitted about the operating member 31 so as to obviate the possibility of water passing from the vat upwardly into the annular space between the tubular member 37 and the hub and thence downwardly through the member 37 to the operating motor.

A suitable drainage outlet 40, preferably screened, is provided in the bottom of the vat 10 and preferably is arranged as close to the bottom of the inclined wall of the bottom 11 as is practical. Communicating with the outlet is a drainage conduit 41 which as shown in Fig. 1 terminates in a suitable valve housing 42. The conduit 41, while it may be a separate pipe, preferably and, as shown, will be formed integrally with the motor supporting frame 22. The valve housing 42 is provided with a drainage opening 43 surrounded by a valve seat 44. Cooperating with this valve seat is a tubular valve 45 positioned vertically within the valve housing and arranged for vertical opening and closing movements therein. Preferably the lower end of the valve which engages the valve seat will be tapered, the valve seat, of course, being given a corresponding shape so as to interfit with the tapered valve. As shown, suitable upright resilient guide members 46 secured in any suitable manner in the lower portion of the valve housing are provided for the valve 45.

The upper edge of the tubular valve 45 extends somewhat above the upper edge of the drainage opening 40 and thereby provides an overflow passage for the cleansing fluid or other liquid introduced into the vat. This arrangement, as will be readily understood, accurately regulates the level of the liquid which should be maintained in the vat to effect efficient cleansing.

A suitable valve operating member is provided, this member as shown comprising a vertically disposed operating rod 47. The lower end of this rod extends into the valve housing where it is mechanically connected with the valve by a suitable pin connection 48. The upper end of the rod 47 extends to a suitable height for convenience of operation, and may if desired be provided with an operating knob or handle 49. Preferably, suitable spring clamp members 50 will be provided to engage the lower end portion of the rod when it is raised to its upper valve opening position so as to lock the rod in this position. As shown, these members 50 are arranged in the valve housing on opposite sides of the valve rod so that when the valve rod is in its upper position, they will be received in a suitable annular seat 50a provided for them in the lower end of the rod. It will be understood that these springs will be sufficiently strong to hold the valve in its open position, but will be sufficiently yielding to permit the valve to be easily closed by the attendant.

A water inlet conduit or pipe 51, provided with a suitable control valve 51a and connected with a suitable source of water supply, communicates with the interior of the vat by means of a suitable passageway 52 provided in the bushing 18. As shown, (Fig. 2) the pipe 51 is threaded into a suitable opening provided for it in the bushing so that it opens directly into the passageway 52. The upper end of the passageway 52 in turn communicates with an annular channel or groove 53 provided on the upper surface of the bushing 18.

The water which is directed from the passageway 52 into the channel 53 is led to the interior of the vat through suitable passageways or conduit means 54 provided in the impeller blades 15a. It will be observed that the impeller 15 is formed at its lower end with a disc-like member 55 preferably formed integrally with the hollow hub 33 and with the blades of the impeller, this plate having such a diameter that it is sufficiently large to close the annular channel 53. It will also be observed that the impeller blades extend upwardly from this disc-like plate; and that the conduit means attached thereto are arranged so that their lower ends communicate with the passageway 53, while their upper ends open into the vat at the upper surface of the blades. Preferably and as shown, these conduits 54 will be extended somewhat below the lower surface of the plate 55 so as to project directly into the channel 53. Each blade 15a as shown is provided with but a single conduit 54, but it will be obvious that each blade may be provided with any suitable number of conduits. Likewise, the impeller has been shown to have but two blades 15a; the impeller obviously however is not limited to this number since a plurality of blades other than two may be used each of which may be provided with a single or with a plurality of fluid conducting passageways 54 as is desired.

The passageways 54 may be and, as shown, are formed as separate members secured to their respective blades in any suitable manner, as by brazing, or they may be cast in the material forming the blades; if desired the passageways may be cast directly in the impeller when it is being formed, thereby dispensing with separate conduit members.

One of the most important features of my present invention is the provision of these passageways 54 in the impeller blades in that they provide for a simple and efficient means for admitting fresh rinsing water under pressure into the washing vat under such condition that the dishes will be thoroughly rinsed.

In the operation of this form of the invention thus far described, it will be understood that the dishes and like utensils to be cleansed will be placed in their respective supporting trays or baskets 12 and 13. Such utensils as platters, plates, saucers, side dishes, shallow bowls, etc., will be positioned, preferably edgewise, within the compartment 12b of the tray 12, whereas small bowls, glasses, cups, etc., will be placed in the upper tray 13. Knives, forks, silverware, etc., preferably will be positioned in the utensil receiving compartment 12c of the tray 12. As has been pointed out, these utensils may be placed in the trays either with the trays within or without the vat as is most convenient to the attendant.

The requisite amount of cleansing water will be supplied to the interior of the vat by opening the valve 51a in the pipe 51, the proper water level for efficient cleansing being controlled by the overflow valve 45. It will be understood, of course, that a quantity of water less than the maximum, as set by the valve, may be supplied to the vat. If desired, soap or some other suitable cleansing substance may be added to the water or may be applied directly to the utensils to be cleansed.

When the dishes and like utensils have been placed in their respective trays and the requisite amount of water has been supplied to the vat and the lid or cover 10a has been closed, the motor 16 may be energized so as to effect rotary motion of the impeller 15. This operation will cause the cleansing fluid in the lower portion of the vat to be thoroughly circulated upwardly and outwardly through the open-work dish supporting trays and against the dishes therein. It will be understood, of course, that the motor 16 will be provided with a suitable controlling switch or push button station readily accessible to the attendant so that the motor may be conveniently controlled as desired.

This operation of the impeller will be continued until the dishes have been thoroughly cleansed, after which the motor 16 may be deenergized. The valve 45 will then be opened by lifting the handle 49 so as to allow the soiled water to be drained from the outlet 40 and through the drainage conduit 41.

In order to rinse the utensils with clean fresh water, the motor 16 will be reenergized, and the water inlet valve 51a again will be opened so as to permit water under pressure to flow upwardly through the conduits 54 carried by the impeller blades. Water issuing from the conduits 54 under pressure will be forced directly upwardly into the vat; and this upward motion of the jets of water issuing from the conduits compounded with the rotary motion imparted thereto by the action of the impeller will cause the water to be hurled upwardly and outwardly through the utensil supporting trays as a very fine spray and under considerable pressure. This operation will be continued until the dishes have been thoroughly rinsed. It will be understood that this rinsing operation will also serve to clean the interior of the vat and other parts of the machine mounted and arranged therein. Preferably, the drain valve 45 will be maintained open during the rinsing operation so as to permit the rinsing water circulated through the vat to pass into the draining conduit 41.

After the dishes have thus been rinsed, the trays 12 and 13 with the dishes therein may be removed, or they may remain in place in the vat until the dishes and utensils are thoroughly dry after which they may be removed.

The rinsing or spray device provided on the impeller may also be used to considerable advantage in giving the utensils a preliminary spraying or rinsing before they are subjected to the direct washing action of the impeller. Thus, the rinsing device may, if desired, perform the important function of thoroughly wetting the utensils and of removing a great deal of the foreign matter adhering to them before the cleansing water is allowed to accumulate in the vat to receive the more positive action of the impeller itself. To effect this preliminary rinsing, the impeller will be rotated and water under pressure will be admitted to the vat through the impeller conduits 54 so that the water issuing therefrom will be sprayed upwardly and outwardly through the trays 12 and 13; during this operation it is preferable that the drain valve be open so that a large portion of the grease and food soil removed from the dishes by the spray will flow from the vat and down through the drain. Of course, while allowing the water to accumulate in the vat for the subsequent washing action of the impeller, the impeller should be stopped in order that the proper amount of cleansing water can be regulated by the overflow valve 45.

Another important feature of my invention is the provision of suitable means whereby the electric driving motor 16 may be conveniently utilized for other applications than that of driving the impeller of the machine. For this purpose, I provide a suitable power shaft 56, preferably of the flexible type, arranged to be readily connected to the motor shaft so as to transmit power therefrom to be utilized by other suitable utensils. In one form, the flexible shaft 56 may comprise a suitable casing 57 in which a flexible power transmitting member 58 is enclosed. The shaft 56 can be connected with the lower end of the motor shaft 30 by any suitable detachable joint. For the purpose of illustration, I have shown the motor shaft provided with a downwardly projecting portion 30b having a square or some other suitable non-circular cross-section which when the flexible shaft 56 is applied is received in a suitable recess (not shown) provided in the flexible member. When the flexible shaft is applied, the outer casing 57 will be connected to and supported by the motor frame 16, a suitable bayonet-joint connection 59 being provided for this purpose. It will be understood that by reason of this arrangement the outer casing will be secured to the motor frame, whereas the flexible power transmitting member 58 may be rotated within the stationary casing by means of the motor shaft 30 to which it is positively connected.

It will be understood that the flexible shaft 56 may be used for operating such apparatus as egg beaters, cream beaters, ice cream freezers, etc., and that it may be used irrespective of whether the dish washing machine is being used at the same time or not.

In Fig. 3 I have shown a modified form of my invention in which the dish washing machine, like that of Figs. 1 and 2, is provided with a vat having a frusto-conical bottom 60. This bottom is provided with an aperture 61 in which a suitable bushing 62 supporting an impeller driving motor 63 through the medium of a suitable frame 64 is mounted. The arrangements of the bushing 62 in its opening, of the supporting motor frame 64 and of its mechanical connection with the bushing are substantially the same as the arrangements of the corresponding parts shown in Figs. 1 and 2.

The vat, as before, is provided in its lower portion with a suitable dasher or impeller 65 having a vertically extending hollow hub 66. This hollow hub, as shown, at its lower end portion supports suitable impeller blades 65a which may be secured in any well-known manner to the hub. The operating member 67 for the impeller, however, in this case extends upwardly for a considerable distance into the vat. As a matter of fact it extends upwardly for such a distance that the upper end of the member projects well over the lower utensil supporting basket 68. Surrounding this operating member and arranged substantially concentrically therewith is a stationary tubular member 69. This member, as shown, is secured at its lower end to the motor frame. For this purpose the motor frame may be and, as shown, is provided with an upwardly projecting hub portion 70 in concentric arrangement about the tube 69. The lower end of the tube is secured to this motor hub portion in any suitable manner as by brazing. Suitable bearing members 71 for the impeller operating member are located in the upper and lower end portions of the tubular member 69.

As shown, the upper end of the hollow cylindrical impeller hub 66 is provided with a water distributing member 72, and it is this member that serves to connect the impeller with its operating member 67. This member 72, which preferably is formed integrally with the hub 66, is secured for rotation to the upper end of the operating member 67 by means of a suitable key or slotted connection (not shown), and has its lower surface arranged to bear on the upper surface of the upper bearing member 71. A set screw 73, as shown, serves to prevent vertical lift of the impeller.

The water distributor 72, as shown, is provided with a plurality of radially disposed fluid conducting passageways 74 which are arranged in the body of the distributor at an angle of substantially 45° with its vertical axis. These passageways, it will be observed, open upon the upper and outer surfaces of the distributor, and flare outwardly as they approach the surface of the distributor.

In order to conduct a cleansing fluid to the distributor 72, I have provided a suitable elbow 75 disposed below the bottom 60. In the horizontal branch of this elbow is threaded a suitable inlet pipe 76 leading from a suitable source of water supply. The upper end portion of the vertical branch of the elbow is in threaded engagement with the bushing 62 provided in the bottom wall 60, and the lower end of this branch is in concentric arrangement with the upwardly projecting motor hub portion 70 to which it is secured in any well-known manner, as by brazing. Secured to the upper end portion of the vertical branch of the elbow and arranged intermediate and in substantially concentric arrangement with the stationary cylindrical member 69 and the impeller hub portion 66 is a stationary tubular member 77. This member may be secured at its lower end to the elbow 75 in any suitable manner, as by brazing, and as shown, extends upwardly throughout the full length of the tubular member 69 and the surrounding hub portion 66. At its upper end 77a the tubular member 77 preferably will be flared outwardly in the direction of the axes of the nozzles 74 provided in the water distributor. The water distributor is provided with a suitable annular recess 78 which receives the flared portion 77a of the tubular member. It will be observed that by reason of this arrangement, water which is supplied to the elbow 75 from the supply source 76 will be directed upwardly through the annular passageway provided between the tubular members 69 and 77 and from these members will be delivered to the nozzle passageways 74 provided in the water distributor.

The bottom wall 60 of the vat is provided with a suitable drainage outlet 79, preferably screened, draining into a suitable drainage conduit 79a which, as before, is in communication with a suitable control valve arrangement (not shown), but which preferably will have substantially the same construction as the valve arrangement shown in Fig. 1.

It is to be understood that the vat of Fig. 3, like the vat of Fig. 1, will be provided with a pair of utensil supporting baskets. I have deemed it to be necessary to show the lower basket only. The upper basket will have a construction substantially the same as the upper basket 13 of Fig. 1, whereas the lower basket 68 of Fig. 3 will be similar in its construction to the basket 12 of Fig. 1, but will be provided with an aperture 68a provided in the central compartment of the basket for receiving the projecting impeller hub 66 and its associated members. The basket 68 preferably will be provided about this aperture with an upright open-work projecting wall 68b in substantially concentric arrangement with the impeller hub.

In the operation of this form of my invention, as thus far described, it will be understood that the dishes and like utensils to be cleansed will be placed within their respective supporting racks which will be positioned in the vat. If desired, the dishes and utensils may be subjected to a rinsing action so as to cleanse them of a large amount of the grease and food soil which adheres to them before they are washed by the more positive action of the impeller. To effect this, the impeller will be rotated as fresh water is being introduced to the vat so that the water will be hurled upwardly and outwardly as a spray through the supporting racks by the water distributor 72. During this operation the drain valve (not shown) preferably will be held in its open position so as to permit the preliminary rinsing water together with the particles removed from the utensils to drain freely from the vat. It will be understood that the fresh water admitted from the water supply pipe 76 during this operation will be directed from the source 76 by the elbow 75 up through the annular passageway between the tubular members 69 and 77 and thence out through the water distributor 72 and into the vat.

After the utensils have thus been subjected to a preliminary rinsing, the vat will be provided with cleansing water for the washing action of the impeller itself, the motor 63, the impeller 65 and the water distributor 72 being stationary during this operation. The proper level of the water in the vat is controlled by the overflow valve provided for the machine.

As before, after the dishes have been placed upon their supporting racks and the cleansing water has been supplied to the vat and the vat has been closed by a suitable closing or cover member (not shown), the motor 63 will be energized to rotate the impeller 65. This operation of the impeller will throw the cleansing water upwardly and outwardly through the dish supporting racks so as to cleanse the utensils supported thereon, and will be continued until the dishes have been thoroughly cleansed, after which the overflow valve will be opened so as to allow the soiled water to drain from the outlet 79. After the vat has been drained of the soiled water, the water supply pipe 76 may be opened so as to permit clean, fresh water under pressure to pass upwardly through the water distributor 72. As water passes from the distributor it will be hurled upwardly and outwardly in a spray-like form over and through the supporting racks so as to provide a thorough rinsing of the dishes, it being understood that the motor 63 will be rotating during this operation of the machine. During the rinsing operation, it is preferable to allow the overflow valve to remain open so as to permit the rinsing water to flow freely through and from the vat.

An important feature of this form of my invention is the provision of suitable means for cleansing pans and like utensils to which food or other foreign matter so firmly adheres as not to be removable by the ordinary washing process. For this purpose, I have provided suitable mops, brushes and the like arranged to be operated by the impeller. In Fig. 3 I have shown a suitable mop device 80 which is particularly adapted to the cleaning of cooking dishes, etc. This cleansing device 80 comprises a mop 81 formed of some suitable cleansing material, such as bristles, wool, steel wool, and the like, provided in a suitable holder or supporting member 82. This member 82 as shown has a substantially cylindrical form and is arranged to be attached to the impeller through the medium of a suitable upwardly projecting cylindrical portion 83 provided on the water distributor 72. The member 82 is arranged to be fitted about the projecting portion 83 in concentric arrangement therewith, and to be detachably secured thereto in any suitable manner, as by means of a suitable bayonet joint 84. It will be understood that in using the cleansing device 80, the motor 63 will be energized so as to rotate the impeller and thus the mop 81 connected therewith, the surfaces of the dishes to be cleansed being applied by the attendant to the mop as it is rotated by the motor. If desired, water may be admitted to the impeller during this operation so as to be forced directly against the surfaces being cleansed. It will be understood that the streams of water thus projected will thoroughly flush the surfaces applied to the cleansing device and thereby help to wash out the food soil and like or other foreign matter adhering to its surfaces.

In Fig. 4 I have shown a cleansing device 85 particularly useful in connection with the cleansing of skillets, pans, etc. This device as shown comprises a wire brush-like cleansing portion 86 provided in a suitable holder 87. To the lower portion of this holder are secured a plurality of resilient members 88 intended to be secured to the water distributor 72 by means of leg portions 89 which are arranged to be received in corresponding nozzles 74 of the distributor. When the cleansing device 85 is applied to the water distributor the resilient legs 89 will be projected into the nozzles and will be pressed inwardly against the body of the distributor so as to rigidly secure the brush thereto. In using this device, the motor 63 will be energized so as to rotate the brush, and the surfaces to be cleansed will be applied to the wire brush as it is being rotated.

The motor 63 of this form of the invention, like the motor 16 of Figs. 1 and 2, may also be utilized for applications other than that of driving the impeller 72, such as operating egg beaters, ice cream freezers, etc., and for this purpose a suitable flexible shaft 90 having a construction similar to the flexible shaft 56 of Figs. 1 and 2 is detachably secured in any suitable manner to the lower end of the motor shaft. Preferably this connection will be of substantially the same construction as the corresponding connection shown in Figs. 1 and 2. It is to be understood that the flexible shaft 90 may, if desired, be connected with the upper end portion of the impeller 65 by means of any suitable readily detachable mechanical joint such as a bayonet-joint (not shown).

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A washing machine comprising a vat for receiving articles to be cleansed and a washing fluid, an impeller in said vat having a blade for engaging and circulating said washing fluid over and about said articles, a substantially vertically arranged conduit on a face of said blade, means for conducting a cleansing fluid to said conduit so that when said impeller is rotated, fluid issuing from said conduit will be circulated in spray form in said vat and means for rotating said impeller.

2. A dishwashing machine comprising a washing chamber adapted to receive utensils to be cleansed and a washing fluid, an impeller in said chamber provided with blades arranged to circulate said washing fluid throughout the chamber, a plurality of substantially vertically arranged conduits carried by said blades, each conduit having its upper end opening into said vat at a point immediately above said blades, means for supplying fluid to the other end of each of said conduits, and means for rotating said impeller.

3. A dish washing machine comprising a washing vat adapted to receive a cleansing fluid, a dish supporting rack in said vat, an impeller in said vat below said rack provided with blades arranged to throw said cleansing fluid upwardly and outwardly through said rack, substantially vertically arranged conduit means on said impeller blades for spraying a rinsing fluid upwardly and outwardly through said rack, conduit means for supplying said vertically arranged conduit means with rinsing fluid and means arranged to rotate said impeller.

4. A dish washing machine comprising a washing chamber, a dish supporting rack within said chamber, an impeller within said vat below said rack provided with blades arranged to throw water in the bottom of said chamber upwardly and outwardly through said rack, a driving motor connected to operate said impeller, a source of water supply and conduit means carried by said impeller blades connected to said source of supply and communicating with the interior of said chamber.

5. A dish washing machine comprising a vat, a dish supporting rack in said vat, an impeller within said vat below said rack and having blades arranged to throw a cleansing fluid placed within the bottom of said vat upwardly and outwardly through said rack, conduit means for conducting a rinsing fluid to said vat, conduits carried by the blades of said impeller communicating with said means for conducting said rinsing fluid upwardly through said blades whereby said fluid is sprayed upwardly and outwardly through said rack upon rotary motion of said impeller, and means for rotating said impeller.

6. A dish washing machine comprising a washing vat provided with a dish and like utensil supporting rack, supply means for admitting water to said vat, an impeller in said chamber below said rack provided with members arranged to be partially immersed in the water supplied to said vat and so as to engage said water and throw it upwardly and outwardly through said rack, conduit means connected to said water supply means through said impeller comprising conduits carried by said water engaging members whereby water under pressure may be forced into contact with the dishes in said rack, and means for rotating said impeller.

7. A dish washing machine comprising a washing vat provided with an inverted frusto-conical bottom wall, a dish supporting rack in said vat above said bottom wall, an impeller arranged in said bottom wall with its axis vertical in substantial coincidence with the central vertical axis of said vat and provided with means so that washing fluid in the bottom of said vat is hurled upwardly and outwardly when said impeller is rotated, an annular fluid receiving channel below said impeller, means for supplying said channel with a cleansing fluid, a plurality of fluid conducting members arranged substantially vertically on said impeller and having their lower ends communicating with said channel and their upper ends opening above said impeller so that said cleansing fluid introduced to said channel under pressure is forced upwardly through said conduit members and discharged when said impeller is rotated as a spray upwardly and outwardly through said rack, and means for rotating said impeller.

8. A dish washing machine comprising a vat, a dish and like utensil supporting rack in said vat, an impeller within said vat provided with blades arranged to circulate a washing fluid from the bottom of said vat upwardly and outwardly through said rack so as to cleanse the dishes supported therein, substantially vertically arranged conduit members carried by said blades for spraying a rinsing fluid over said dishes by the rotation of said impeller, means for conducting a rinsing fluid to said conduit members and means for rotating said impeller.

9. A dish washing machine comprising a vat for receiving dishes and the like and a cleansing fluid, an impeller in said vat provided with blades arranged to circulate said cleansing fluid over and about said dishes, a plurality of spray conduits carried by said impeller blades arranged to spray a rinsing fluid over and about said dishes by the rotation of said impeller, means for conducting a rinsing fluid to said spray conduits and means for rotating said impeller.

10. A dishwashing machine comprising a washing vat, a dish supporting rack in said vat, an impeller in said vat below said rack provided with blades arranged to throw a cleansing fluid upwardly and outwardly through said rack, a plurality of fluid conduits arranged substantially vertically on said impeller blades, fluid supply conduit means communicating with said conduits and means for rotating said impeller.

11. A dish washing machine comprising a vat adapted to receive a cleansing fluid, a dish and like utensil supporting rack in said vat, an impeller in said vat below said rack having means arranged to throw said cleansing fluid upwardly and outwardly through said rack to cleanse the dishes supported thereon, an electric motor, means mechanically connecting said electric motor with said impeller so that the latter is rotated by said motor, a spray device comprising conduits mounted on said impeller fluid throwing means so as to be rotated by said impeller, a source of fluid supply, conduit means for conducting fluid from said source to said conduits so that when said impeller is rotated said fluid from said source is sprayed over the dishes supported in said rack.

12. A dishwashing machine comprising a vat for receiving dishes and the like and a cleansing fluid, an impeller in said vat arranged to circulate said cleansing fluid over and about said dishes, a shaft for rotating said impeller, a motor exterior of said vat, means mechanically connecting said motor with said shaft so that said impeller is rotated by said motor, a spray device mounted on said impeller and fluid supply conduit means arranged substantially concentrically of said shaft communicating with said spray device for supplying a rinsing fluid thereto.

13. A dishwashing machine comprising a washing vat provided with a dish supporting rack, an impeller within the lower portion of said vat having means arranged to throw a cleansing fluid in said lower portion against the dishes in said rack, said impeller having a hub portion extending vertically within said vat so as to project above said rack, a spray device mounted on the upper end of said hub, means for conducting a rinsing fluid to said spray device and means for rotating said impeller.

CARL M. SNYDER.